(12) United States Patent
Brun et al.

(10) Patent No.: US 11,494,709 B2
(45) Date of Patent: Nov. 8, 2022

(54) SYSTEM AND METHOD FOR INTEGRATING HETEROGENEOUS DATA OBJECTS

(71) Applicant: AMADEUS S.A.S., Biot (FR)

(72) Inventors: Pierre Brun, Valbonne (FR); Jean-Chafic Hays, Nice (FR); Fabien Le Metayer, Cannes (FR); Tony Bisegna, Vallauris (FR); Floriane Faudet, La Colle sur Loup (FR)

(73) Assignee: AMADEUS S.A.S., Biot (FR)

( * ) Notice: Subject to any disclaimer, the term of this patent is extended or adjusted under 35 U.S.C. 154(b) by 316 days.

(21) Appl. No.: 16/699,233

(22) Filed: Nov. 29, 2019

(65) Prior Publication Data
US 2020/0379972 A1   Dec. 3, 2020

(30) Foreign Application Priority Data
May 29, 2019   (FR) ...................... 1905718

(51) Int. Cl.
*G06F 16/22*   (2019.01)
*G06Q 10/02*   (2012.01)
(Continued)

(52) U.S. Cl.
CPC ............ *G06Q 10/02* (2013.01); *G06F 16/22* (2019.01); *G06F 16/23* (2019.01);
(Continued)

(58) Field of Classification Search
CPC ..... G06Q 10/02; G06F 16/22; G06F 16/2379; G06F 16/23; G06F 16/2456; G06F 16/258; G06F 16/2358
See application file for complete search history.

(56) References Cited

U.S. PATENT DOCUMENTS

2016/0217216 A1*   7/2016   Baird ................... G06Q 10/10

FOREIGN PATENT DOCUMENTS

| WO | WO-2012170565 A2 | 12/2012 |
| WO | WO-2013148470 A1 | 10/2013 |

OTHER PUBLICATIONS

Dong, Xin Luna et al. "Data fusion: resolving data conflicts for integration." Proceedings of the VLDB Endowment 2.2 (2009): 1654-1655.

(Continued)

*Primary Examiner* — Truong V Vo
(74) *Attorney, Agent, or Firm* — Perry + Currier (57) ABSTRACT

A method of integrating data objects includes: storing (i) an originating record containing a first unique identifier and a first set of data fields defining a first item supplied by a first provider, and (ii) a destination record containing a second unique identifier and a second set of data fields defining a second item supplied by a second provider; receiving an instruction to merge the originating record into the destination record, the request containing the first and second unique identifiers; in response to receiving the instruction, updating the destination record by: comparing the first set of data fields with the second set of data fields; and for each data field of the first set that matches a corresponding data field of the second set, marking the corresponding data field of the second set as a shared field; and sending the updated destination record to a client device for display.

15 Claims, 9 Drawing Sheets

(51) Int. Cl.
  *G06F 16/23*  (2019.01)
  *G06F 16/25*  (2019.01)
  *G06Q 50/12*  (2012.01)
  *G06F 16/2455*  (2019.01)
  *G06F 16/248*  (2019.01)

(52) U.S. Cl.
  CPC ...... *G06F 16/2358* (2019.01); *G06F 16/2379* (2019.01); *G06F 16/248* (2019.01); *G06F 16/2456* (2019.01); *G06F 16/252* (2019.01); *G06F 16/258* (2019.01); *G06Q 50/12* (2013.01)

(56) References Cited

OTHER PUBLICATIONS

Dong, Xin Luna et al., Slide Deck for Tutorial entitled: "Data fusion: resolving data conflicts for integration." Data Fusion, VLDB 2009 Tutorial.

\* cited by examiner

SYSTEM AND METHOD FOR INTEGRATING HETEROGENEOUS DATA OBJECTS

CROSS-REFERENCE TO RELATED APPLICATIONS

This application claims priority from French Patent Application No. 1905718, filed May 29, 2019, the contents of which are incorporated herein by reference.

FIELD

The specification relates generally to computing systems, and specifically to a system and method for integrating heterogeneous data objects.

BACKGROUND

Obtaining certain types of generated data may be performed via two or more distinct generation mechanisms involving separate computing subsystems, communication protocols and the like. However, subsets of such generated data obtained via different mechanisms may nevertheless be associated. For example, in connection with items such as travel-related products and services (e.g. flights, hotel reservations and the like), an itinerary for a given customer may include a plurality of flights, some of which are obtained via a first generation mechanism and others of which are obtained via a second generation mechanism. Because the generation mechanisms are independent from one another, display and applying updates to the resulting subsets of data may be accommodated by independent interfaces.

SUMMARY

An aspect of the specification provides a method of integrating data objects, the method comprising: storing, at an intermediation server, (i) an originating record containing a first unique identifier and a first set of data fields defining a first item supplied by a first provider, and (ii) a destination record containing a second unique identifier and a second set of data fields defining a second item supplied by a second provider; receiving at the intermediation server, from a client device, an instruction to merge the originating record into the destination record, the request containing the first and second unique identifiers; in response to receiving the instruction, updating the destination record by: (i) comparing the first set of data fields with the second set of data fields; and (ii) for each data field of the first set that matches a corresponding data field of the second set, marking the corresponding data field of the second set as a shared field; and sending the updated destination record to the client device for display.

Another aspect of the specification provides an intermediation server, comprising: a communications interface; a memory storing (i) an originating record containing a first unique identifier and a first set of data fields defining a first item supplied by a first provider, and (ii) a destination record containing a second unique identifier and a second set of data fields defining a second item supplied by a second provider; and a processor connected with the communications interface and the memory, the processor configured to: receive, from a client device via the communications interface, an instruction to merge the originating record into the destination record, the request containing the first and second unique identifiers; in response to receipt of the instruction, in order to update the destination record: (i) compare the first set of data fields with the second set of data fields; and (ii) for each data field of the first set that matches a corresponding data field of the second set, mark the corresponding data field of the second set as a shared field; and send the updated destination record to the client device for display.

A further aspect of the specification provides a non-transitory computer-readable medium storing computer-readable instructions executable by a processor of an intermediation server to: store, in a memory of the intermediation server, (i) an originating record containing a first unique identifier and a first set of data fields defining a first item supplied by a first provider, and (ii) a destination record containing a second unique identifier and a second set of data fields defining a second item supplied by a second provider; and receive, from a client device via a communications interface of the intermediation server, an instruction to merge the originating record into the destination record, the request containing the first and second unique identifiers; in response to receipt of the instruction, in order to update the destination record: (i) compare the first set of data fields with the second set of data fields; and (ii) for each data field of the first set that matches a corresponding data field of the second set, mark the corresponding data field of the second set as a shared field; and send the updated destination record to the client device for display.

BRIEF DESCRIPTIONS OF THE DRAWINGS

Embodiments are described with reference to the following figures, in which.

DETAILED DESCRIPTION

Figure 1:
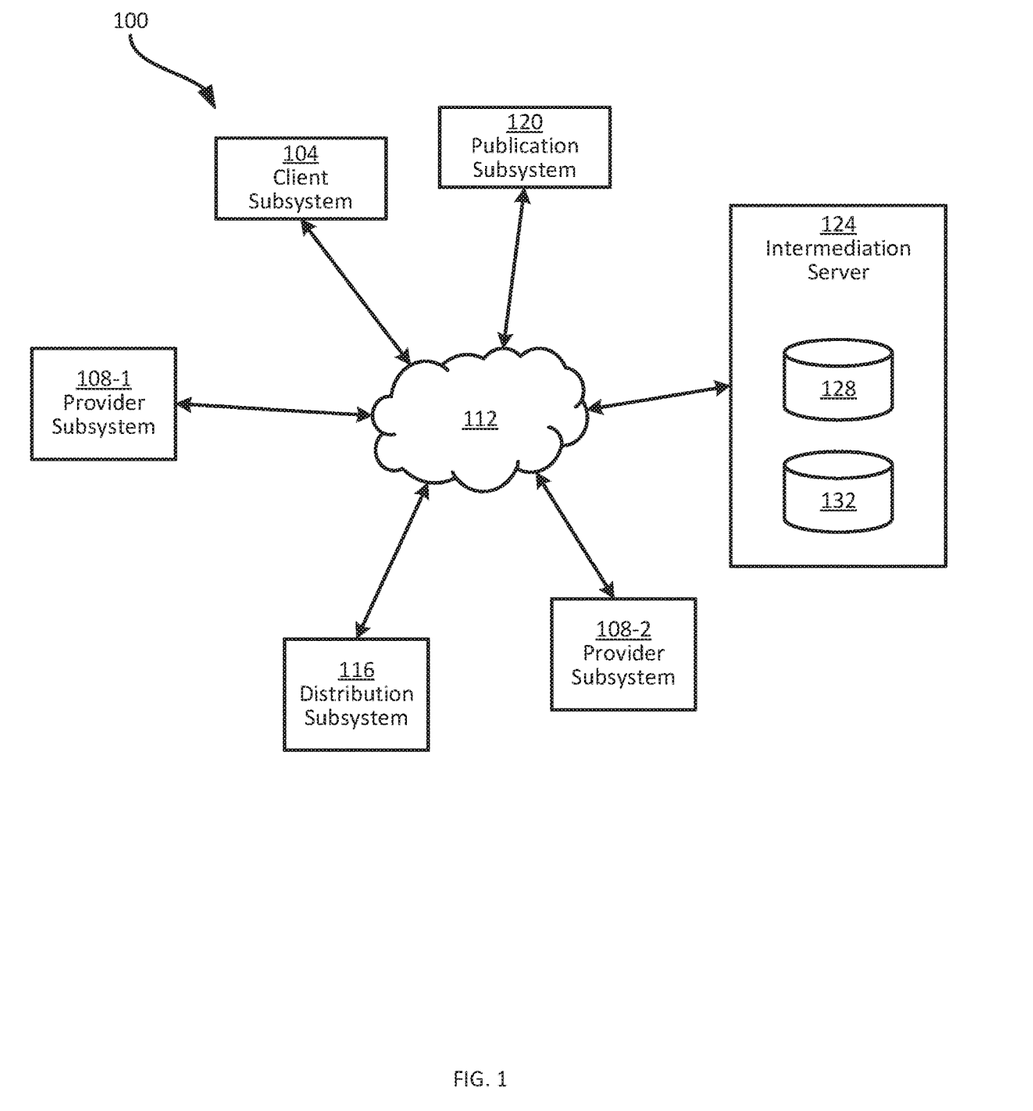
FIG. 1 is a diagram illustrating a system for providing auxiliary data access.

FIG. 1 depicts a system 100 for integrating heterogeneous data objects. Within the system 100, various computing subsystems interact to generate and process data relating to any of a wide variety of activities. In the examples discussed below, the subsystems of the system 100 interact to generate and process data relating to the delivery of items to customers. The items, in the examples, below, are travel-related products and services, such as flight tickets, hotel reservations, vehicle rental reservations, and the like. A wide variety of other activities can be enabled by the exchange of data between the subsystems shown of the system 100, and the specific nature of the data processed within the system 100 is not particularly limited.

In the illustrated example, the system 100 includes a client subsystem 104, operated by a client entity that may also be referred to as a seller. The seller can be, for example, a travel agency. The client subsystem 104 generates requests, e.g. on behalf of customers, for travel items. The requests specify various attributes of the travel items, such as origin and destination locations, times and dates of travel, and the like. Responses to requests from the client subsystem 104 are generated by, or on behalf of, entities that provide the items, referred to herein as providers. Therefore, in the present example the providers are entities such as airlines, hotel operators or the like that deliver the items to the customer, or to other such entities for eventual delivery to the customer, following purchase of the items (such purchase being effected, for example, via the client subsystem 104).

Each provider entity operates a provider subsystem 108; two example provider subsystems 108-1 and 108-2 are shown in FIG. 1. Each of the client subsystem 104 and the provider subsystems 108 are implemented as at least one computing device with input and output assemblies and communications devices for exchanging data via a network 112. The network 112 can include any suitable combination of local-area and wide-area networks, including the Internet. Although a single client subsystem 104 and two provider subsystems 108 are shown in FIG. 1, the system 100 can include a greater or smaller number of client subsystems 104 and provider subsystems 108 in other examples.

The generation of responses to requests from the client subsystem 104 can take various forms. In the illustrated example, provider subsystem 108-1 is assumed to generate responses to such requests locally, although as will be seen below, the requests are not transmitted directly from the client subsystem 104 to the provider subsystem 108-1. That is, the provider subsystem 108-1 includes an offer generation module (e.g. computer readable instructions and corresponding execution hardware, along with various stored data for use in generating responses) that enables the provider subsystem 108-1 to generate response data based on the attributes specified in the request originated by the client subsystem 104. The response data may also be referred to as "offer data", and defines one or more items that match or partially match the requested attributes.

Other provider subsystems 108, such as the provider subsystem 108-2 in the present example, may not generate responses to requests from the client subsystem 104. Instead, such responses may be generated by a distribution subsystem 116. The provider subsystem 108-2 may, for example, publish data defining the items offered by the provider entity that operates the provider subsystem 108-2 to a publication subsystem 120. The publication subsystem 120 may be operated by a third party (i.e. distinct from the above-mentioned provider entities), and may receive published item data such as flight schedules, fares and the like, from one or more provider subsystems 108. The distribution subsystem 120, in turn, may retrieve data from the publication system 120 for use in generating responses to requests from the client subsystem 104 on behalf of the provider subsystem 108-2.

In some examples, the provider subsystems 108 need not be restricted to the use of one mechanism or the other. For example, data representing items provided by the operator of the provider subsystem 108-1 may be obtained via either of the above mechanisms. In further examples, the provider subsystem 108-2 may also be capable of generating responses to client requests locally.

As will now be apparent to those skilled in the art, the generation and transmission of requests by the client device 104, and the generation of response data by or for the provider subsystems 108, can be performed according to either of two distinct mechanisms. The first mechanism involves the generation of response data locally by a provider subsystem 108, and the second mechanism involves the generation of response data by a third party (e.g. the distribution subsystem 116), for example on the basis of data previously published by the provider subsystem 108 (e.g. stored by the publication system 120).

In addition, the distinct mechanisms by which response data may be generated and provided to the client subsystem 104 can involve the use of distinct data exchange standards, communication protocols and the like. For example, the first mechanism mentioned above, in which response data is generated by the provider subsystem 108-1 itself, may be implemented according to the New Distribution Capability (NDC) standard. The NDC standard specifies an eXtensible Markup Language (XML) based data format (e.g. specifying message syntax, API calls and the like) for messages exchanged between client subsystems 104 and provider subsystems 108. The second mechanism, in contrast, in which response data is generated by the distribution subsystem 116, may be implemented as a Global Distribution System (GDS). The second mechanism, therefore, may employ message syntax, sequencing and the like as specified by the Electronic Data Interchange For Administration, Commerce and Transport (EDIFACT) standard.

In other words, data defining items may be obtained by the client subsystem 104 via either or both of two distinct mechanisms, each of which involves interactions by distinct computing subsystems according to separate communication protocols, message syntax and the like. As a result, the data defining such items may not be available to the client subsystem 104 in a consistent format. The client subsystem 104 may therefore acquire data defining a first subset of items via the first mechanism, and data defining a second subset of items via the second mechanism. Such data may be obtained, however, on behalf of a common customer; in a previous system, the client subsystem 104 may be unable to display or otherwise present the above data simultaneously.

The system 100 therefore implements additional functionality to enable the client subsystem 104 to retrieve and display, simultaneously, a set of related data that was generated via either or both of the above mechanisms. That is, the system 100 enables provision of a common interface at the client subsystem 104 for viewing data obtained via either or both of the mechanisms. The system 100 also enables the client subsystem 104 to make updates to item data from the common interface, irrespective of the mechanism by which the data was generated (and therefore of the mechanism employed to update the data).

As noted above, the client subsystem 104 does not interact directly with the provider subsystem 108-1. In the present example, the client subsystem 104 also does not interact directly with the distribution subsystem 116. Rather, the system 100 includes an intermediation server 124, and requests generated by the client subsystem 104 are transmitted via the network 112 to the intermediation server 124. The intermediation server 124 receives requests from the client subsystem 104, and passes such requests to the provider subsystems 108 and/or the distribution subsystem 116. The intermediation server 124 also receives responses from the provider subsystems 108 and/or distribution subsystem 116, for return to the client subsystem 104.

The intermediation server 124, in the illustrated example, hosts data defining items for the client subsystem 104, in addition to relaying data between the client subsystem 104 and the other subsystems shown in FIG. 1. The client subsystem 104, in other words, may not store persistent copies of data defining items locally. Instead, the client subsystem 104 may (e.g. following any suitable authentication process) access such data stored at the intermediation server 124. The intermediation server 124 maintains two repositories 128 and 132, each containing records of item data generated via the first and second mechanisms, respectively. For example, the repository 128 in the present example contains item data obtained via the first mechanism (e.g. according to the NDC standard mentioned above), and the repository 132 contains item data obtained via the second mechanism (e.g. according to the GDS standard mentioned above).

In other examples, the intermediation server 124 can store the above item data in a single repository, with each record including a flag or other indicator of the mechanism by which the data therein was acquired. In any event, as will be discussed in greater detail below, the intermediation server 124 can integrate a record from the second repository 132 into a record from the first repository 128 to enable presentation of data from both records to the client subsystem 104 in a common interface.

Before further discussion of the functionality of the various components of the system 100, certain internal components of the intermediation server 124 will be described in connection with FIG. 2.

Figure 2:
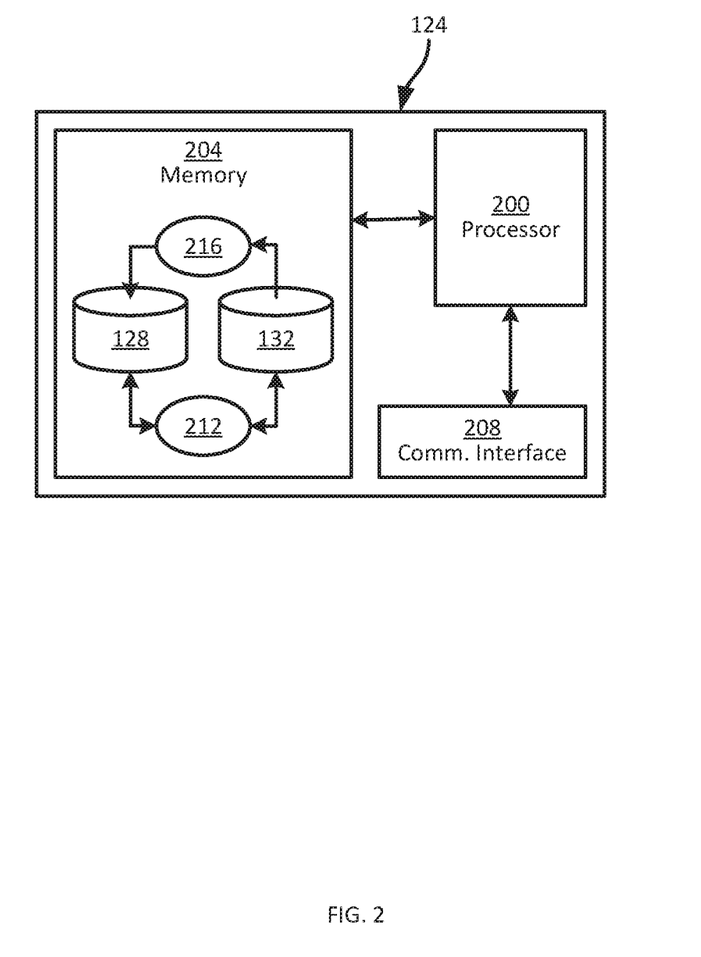
FIG. 2 is a diagram illustrating certain internal components of the client subsystem and the provider subsystem of FIG. 1.

Turning to FIG. 2, the intermediation server 124 includes at least one processor 200, such as a central processing unit (CPU) or the like. The processor 200 is interconnected with a memory 204, implemented as a suitable non-transitory computer-readable medium (e.g. a suitable combination of non-volatile and volatile memory subsystems including any one or more of Random Access Memory (RAM), read only memory (ROM), Electrically Erasable Programmable Read Only Memory (EEPROM), flash memory, magnetic computer storage, and the like). The processor 200 and the memory 204 are generally comprised of one or more integrated circuits (ICs).

The processor 200 is also interconnected with a communication interface 208, which enables the server 124 to communicate with the other computing devices of the system 100 via the network 112. The communication interface 208 therefore includes any necessary components (e.g. network interface controllers (NICs), radio units, and the like) to communicate via the network 112. The specific components of the communication interface 208 are selected based on the nature of the network 112. The server 124 can also include input and output devices connected to the processor 200, such as keyboards, mice, displays, and the like (not shown).

The components of the server 124 mentioned above can be deployed in a single enclosure, or in a distributed format. In some examples, therefore, the server 124 includes a plurality of processors, either sharing the memory 204 and communication interface 208, or each having distinct associated memories and communication interfaces.

The memory 204 stores the repositories 128 and 132 mentioned above, as well as computer-readable instructions executable by the processor 200 to implement various functionality. The computer-readable instructions may also be referred to as applications, and in the illustrated example the memory 204 stores a request handling application 212 and a content integration application 216 (also referred to herein simply as the applications 212 and 216, respectively). In the description below, the processor 200, and more generally the server 124, are said to perform, or to be configured to perform, those actions. It will be understood that they are so configured via the execution (by the processor 200) of the instructions of the applications stored in memory 204.

Execution of the application 212 by the processor 200 configures the server 124 to receive requests from the client subsystem 104 and interact with one or more of the provider subsystems 108 and distribution subsystem 116 to obtain response data for storage in the repositories 128 and/or 132. Execution of the application 212 also configures the server 124 to provide the above-mentioned common interface to the client subsystem 104, from which the client interface can generate requests for item data (or requests to update item data) via either of the mechanisms mentioned earlier.

Via execution of the application 212, for example, the intermediation server 124 can implement functionality as set out in Applicant's co-pending application no. FR 1905718 to provide the common interface. Such functionality includes the provision of data object definitions and update definitions that permit data to be stored in a common, aggregated format regardless of the source of such data (i.e. whether the data was acquired via the first mechanism or the second mechanism). For example, the data may be stored in a common format, regardless of originating mechanism, in the repository 128. The repository 128 may therefore be referred to as the primary or destination repository in the discussion below.

However, in other instances the client subsystem 104 may initiate the acquisition of item data via the second mechanism mentioned earlier (e.g. via GDS). The intermediation server 124 may, for example, also include a further application (not shown) that enables the client subsystem 104 to explicitly request item data obtained via the distribution subsystem 116, which is stored in the repository 132 and is therefore not available via the above-mentioned common interface.

The server 124 is therefore also configured, via execution of the integration application 216, to integrate data from the repository 132 into the repository 128 upon instructions from the client subsystem 104. Any data integrated by the application 216 is made available via the above-mentioned common interface, and may therefore be viewed and updated by the client subsystem 104 alongside data obtained via the first mechanism (e.g. NDC).

Figure 3:
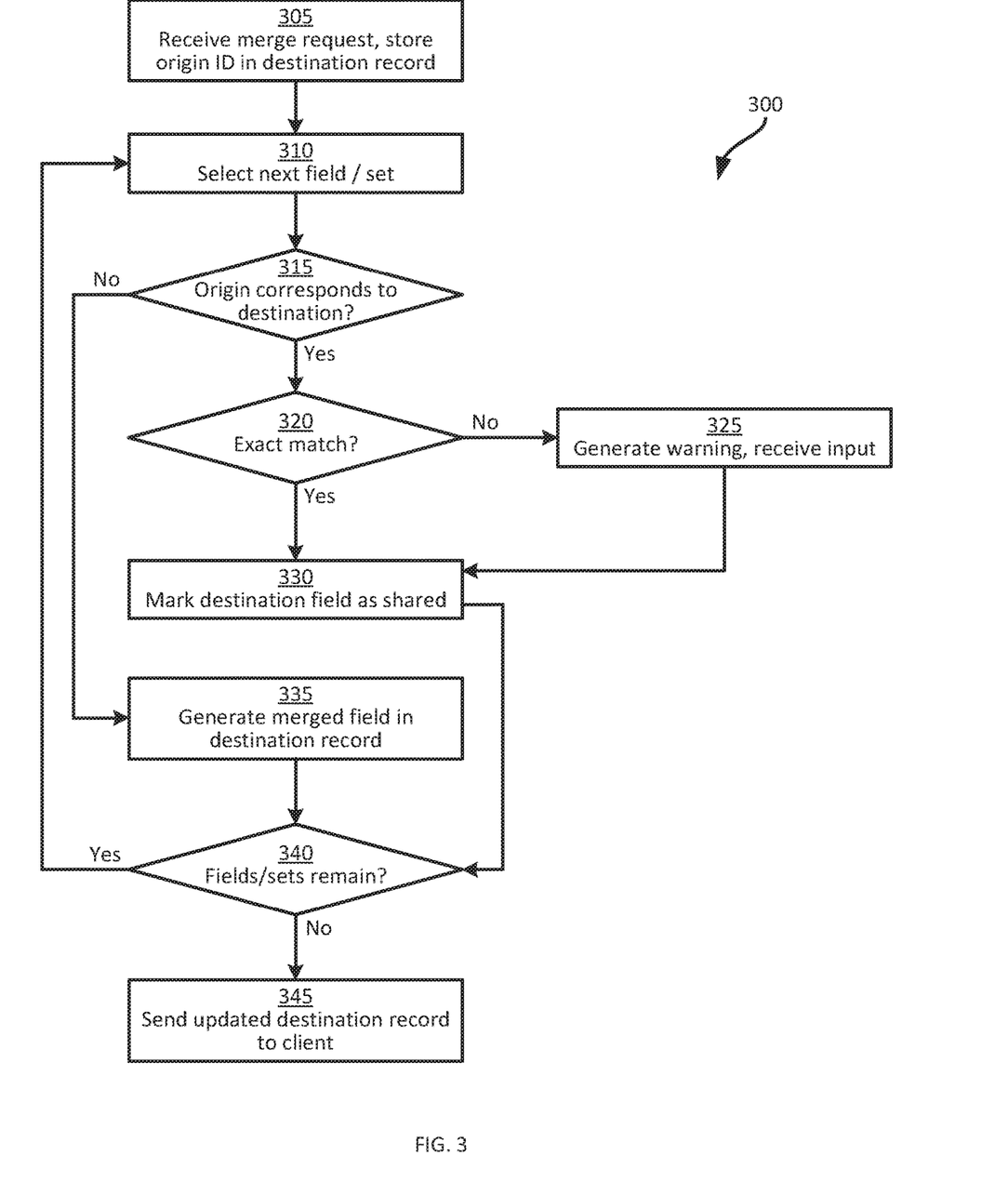
FIG. 3 is a flowchart of a method of integrating heterogeneous data objects.

Turning now to FIG. 3, certain aspects of the operation of the system 100 will be described in greater detail. Specifically, FIG. 3 illustrates a method 300 of integrating heterogeneous data objects. The performance of the method 300 will be discussed in conjunction with its performance within the system 100, and specifically by the intermediation server 124 via execution of the integration application 216.

At block 305, the server 124 receives a request, at the communications interface 208, from the client subsystem 104 to merge or integrate records containing data generated via distinct mechanisms. In particular, the request includes an instruction to merge a record from the repository 128 with a record from the repository 132. The record from the repository 128 is also referred to as the destination record, as the final product of the merging operation will be stored in the destination record. The record from the repository 132, meanwhile, is also referred to as the originating record, as the data from the originating record is imported into the destination record (e.g. as indicated by the arrows connecting the application 216 to the repositories 128 and 132 in FIG. 2).

Figure 4:
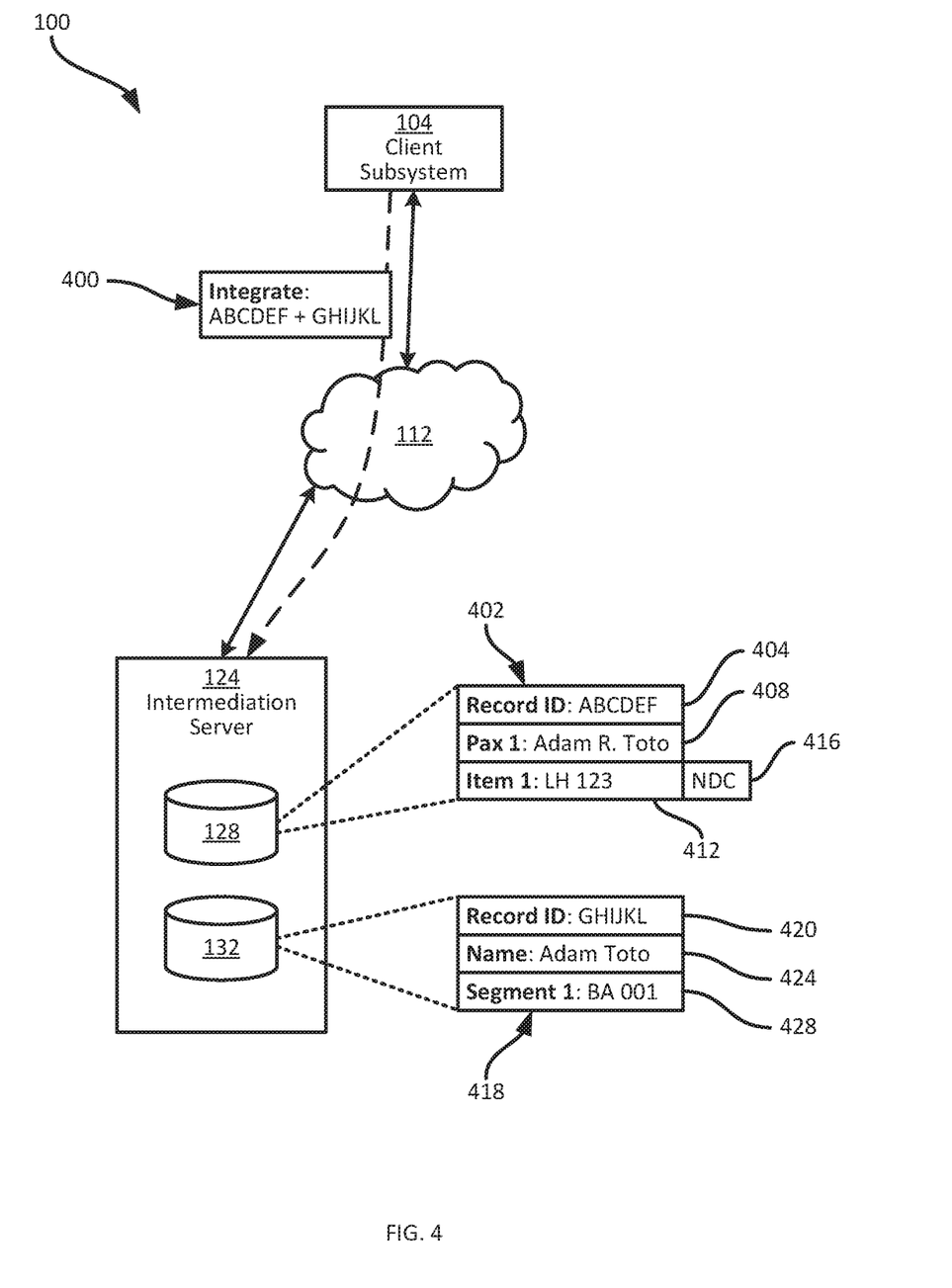
FIG. 4 is a diagram illustrating a performance of block 305 of the method of FIG. 3.

Turning briefly to FIG. 4, an example performance of block 305 is shown. The system 100 is shown in simplified form in FIG. 4, omitting all but the client subsystem 104, the network 112 and the server 124. A request 400 is transmitted from the client subsystem 104 to the server 124 via the network 112, containing an originating record identifier "GHIJKL" and a destination record identifier "ABCDEF". The request can have a wide variety of formats beyond that shown in FIG. 4.

The records having the above identifiers are also shown in FIG. 4. In particular, the repository 128 contains a record 402 (the destination record), having a record identifier 404 and fields or subsets of fields 408 and 412. In addition, the record 402 contains a content type indicator field 416 indicating which generation mechanism was employed to generate the data in the field or set 412. The repository 132 contains a record 418 having a record identifier 420 and fields or sets of fields 424 and 428. The content of the records 402 and 418 will be discussed in greater detail. In general, the request 400 is an instruction to the server 124 to integrate the data in the record 418 into the record 402, in order to enable viewing and updating of the data from both the records 402 and 418 via the above-mentioned common interface.

Figure 5:
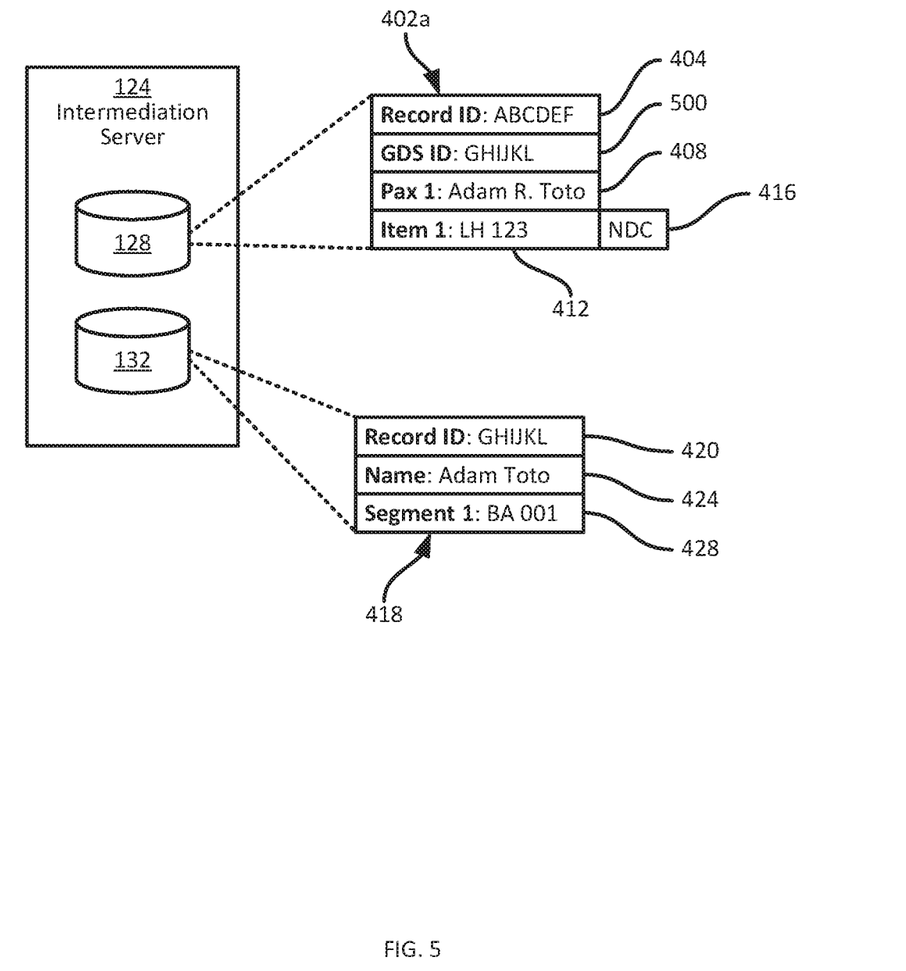
FIG. 5 is a diagram illustrating another aspect of the performance of block 305 of the method of FIG. 3.

Returning to FIG. 3, having received the request at block 305, the server 124 retrieves the relevant records (i.e. the records 402 and 414 in the example illustrated in FIG. 4) and stores the originating record identifier 420 in the destination record 402. Thus, in the present example, as shown in FIG. 5, an updated destination record 402a is generated from the destination record 402. The updated destination record 420a includes the previous contents of the record 402, as well as an originating record identifier 500. The originating record identifier 500 enables the server 124 to continue interacting with, for example, the distribution subsystem 116 to update data imported from the record 418 even after the integration is complete.

At block 310, the server 124 selects a field of set of fields from the record 418 to integrate into the record 402a. For example, the server 124 can select the "name" field 424 for integration at a first performance of block 310. At block 315, the server 124 determines whether the selected field in the originating record 418 matches a corresponding field in the destination record 402a. The corresponding field in the destination record 402a can be identified by way of a stored field mapping maintained at the server 124. The records of the repository 128 each have the same population of fields, although the content of those fields varies from record to record, and certain fields may be repeated different numbers of times (e.g. to represent multiple linked items). Similarly, the records of the repository 132 each have the same population of fields, though the structure of those fields may vary from the fields of records in the repository 128.

The server 124 can store a preconfigured field mapping that establishes which fields of any given record in the repository 128 correspond to which fields of any given record in the repository 132. In other words, the field mapping indicates which fields within the repositories 128 and 132 contain corresponding types of data. For example, the field mapping in the present example can indicate that fields 408 in the repository 128 (containing traveler names) map to fields 424 in the repository 132 (which also contain traveler names).

Thus, at block 315, the server 124 compares the contents of the field 408 as shown in FIGS. 4 and 5 with the contents of the field 424 as shown in FIGS. 4 and 5. The determination at block 315 can be a determination of whether the fields match exactly. However, in the present example the server 124 is also configured to detect potential data collisions, in which fields that are not exactly matched should in fact be merged into a single field. Therefore, at block 315 the server 124 can generate a similarity metric (e.g. also referred to as a string distance function) from the selected fields. For example, the metric may indicate as a percentage how similar the content of the compared fields is, with 100% indicating an exact match. The determination at block 315 can be affirmative when the similarity metric exceeds a predefined threshold (e.g. 80%), and negative otherwise.

As seen from FIG. 5, in the present example the determination is assumed to be affirmative because, although the names shown in the fields 408 and 424 do not match exactly, they are separated by only three characters ("R", a period, and a space between the first and last names "Adam" and "Toto"). The server 124 therefore proceeds to block 320.

At block 320, the server 124 determines whether the selected fields match exactly. For example, the server 124 can determine whether the above-mentioned metric is 100%. When the determination at block 320 is negative, as in the example illustrated in FIGS. 4 and 5, the server 124 proceeds to block 325. At block 325, the server 124 can generate a warning, such as a prompt sent to the client subsystem 104 requiring operator action to select one of the available values (e.g. "Adam Toto" or "Adam R. Toto") for storage in the merged record. The server 124 awaits input from the client subsystem 104 making such a selection.

Figure 6:
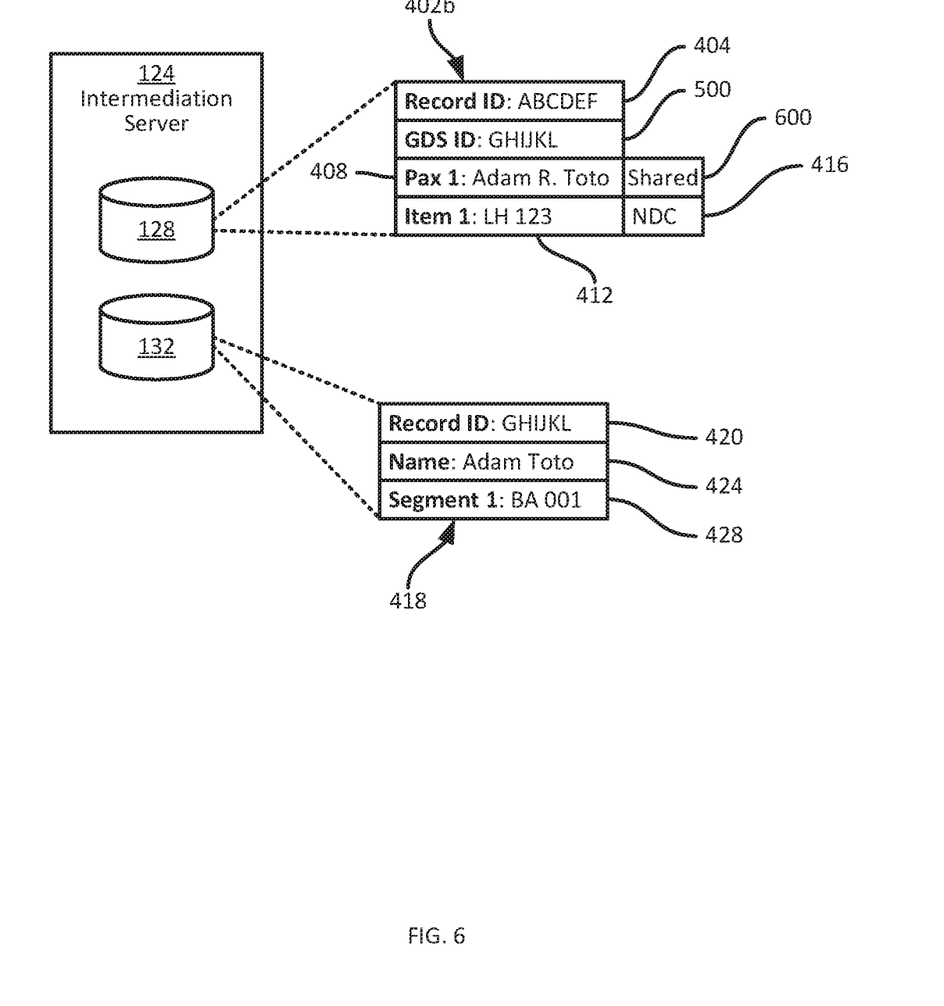
FIG. 6 is a diagram illustrating a performance of block 330 of the method of FIG. 3.

In the present example performance of the method 300, it is assumed that the client subsystem 104, in response to the prompt generated at block 325, transmits a selection of the string "Adam R. Toto" for use in the merged field. Therefore, at block 330, the server 124 does not update the contents of the field 408, but marks the field 408 as a shared field, e.g. with a flag 600 as shown in FIG. 6. FIG. 6 illustrates a further updated version of the record 402, indicated as 402b. The flag 600 indicates that the field 408 is associated with content obtained via both of the above-mentioned mechanisms. In some examples, the server 124 can also be configured to send an instruction via the second (e.g. GDS-based) mechanism to update the name stored in the field 424 to reflect the name as stored in the field 408. When both versions of the name (i.e. as shown in the fields 408 and 424) are retained, any instructions sent via the second mechanism use the name as shown in the field 424.

Following the performance of block 330, the server 124 proceeds to block 340 and determines whether fields or sets of fields remain to be processed. When the determination is affirmative at block 340, the server 124 returns to block 310 and selects the next field in the originating record 418, e.g. the field 428. In the present example, the field mapping is assumed to indicate that "segment" fields in originating records of the repository 132 correspond to "item" fields in destination records of the repository 128. Therefore, at block 315 the field 428 is compared to the field 412 as described above in connection with the fields 424 and 408.

As is evident from FIGS. 4-6, the values stored in the fields 428 and 412 have little in common. The field 412 stores an identifier for a Lufthansa flight, while the field 428 stores an identifier for a British Airways flight. The fields 412 and 428 may include subfields or associated fields containing, for example, price information, origin and destination locations, and the like. Such fields may also be compared according to the field mapping. In other examples, however, only a main value (such as the above-mentioned flight identifiers) may be compared at block 315, and the subfields or associated fields can all be processed according to the determination based on the main field.

Figure 7:
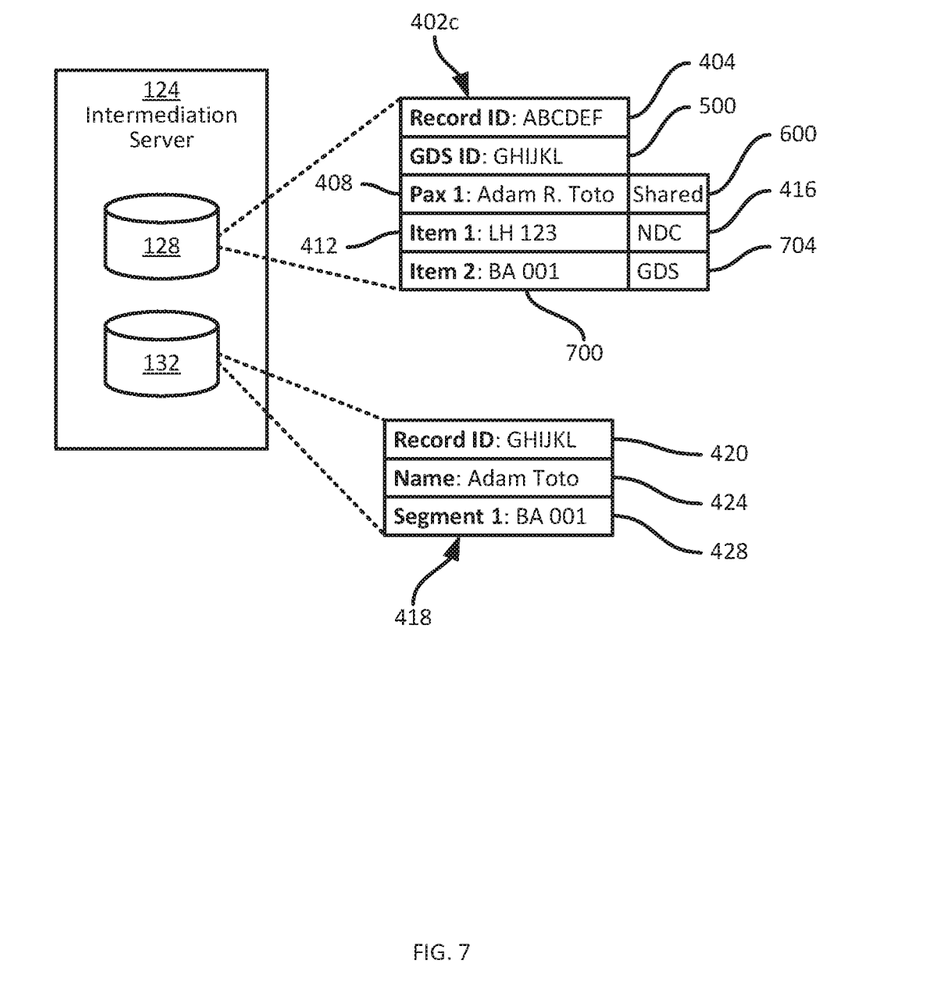
FIG. 7 is a diagram illustrating a performance of block 335 of the method of FIG. 3.

Following a negative determination at block 315, the server 124 proceeds to block 335. At block 335, the server 124 generates a new merged field in the destination record 402, and inserts therein the content of the originating field (i.e. the field 428 in this example). FIG. 7 illustrates the result of a performance of block 335. In particular, the record 402b has been updated to a record 402c, containing (in addition to previously discussed content) a field 700 that contains the flight identifier imported from the field 428 of the record 418. In addition, as shown in FIG. 7, the server 124 can mark the merged field 700 as being associated with the originating record. In the illustrated example, the marking is performed by storing a flag 704 with the field 700 that indicates the distribution channel (i.e. the generation mechanism) through which the content of the field 700 was obtained. Other ways of marking the field 700 are also contemplated, however. For example, the identifier "GHIJKL" itself of the record 418 can be used as a flag associated with the field 700.

The creation of a field such as the field 700 at block 335 may include transforming the data in the field 428 according to format and syntax requirements of the repository 128. Such transformation can be performed according to the data object definitions mentioned above and described in detail in the co-pending application FR 1905718.

The above process is repeated until a negative determination results from block 340, indicating that the entirety of the originating record 418 has been integrated into the destination record 402. The server 124 then proceeds to block 345, at which the server 124 can transmit the updated record 402c to the client subsystem 104 for simultaneously display of content obtained via both generation mechanisms. In some examples, the record 418 is discarded or marked as inactive when generation of the record 402c is complete.

The system 100 therefore enables common viewing and editing of data at the client subsystem 104 for data that was initially generated via distinct, conventionally incompatible data generation mechanisms. In addition, the processes above enable continued updating of the data via such generation mechanisms by marking portions of the integrated data record with an indication of their associated generation mechanism.

Variations to the above systems and methods are contemplated. For example, upon receiving a request at block 305 the server 124 can apply security policies to the request, e.g. to determine whether the client subsystem 104 has access to both the records identified in the request. For example, each record in the repositories 128 and 132 can include identifiers of entities with access to the records, and the server 124 can be configured to verify that the client subsystem 104 appears in such identifiers in both records identified by the request.

Figure 8:
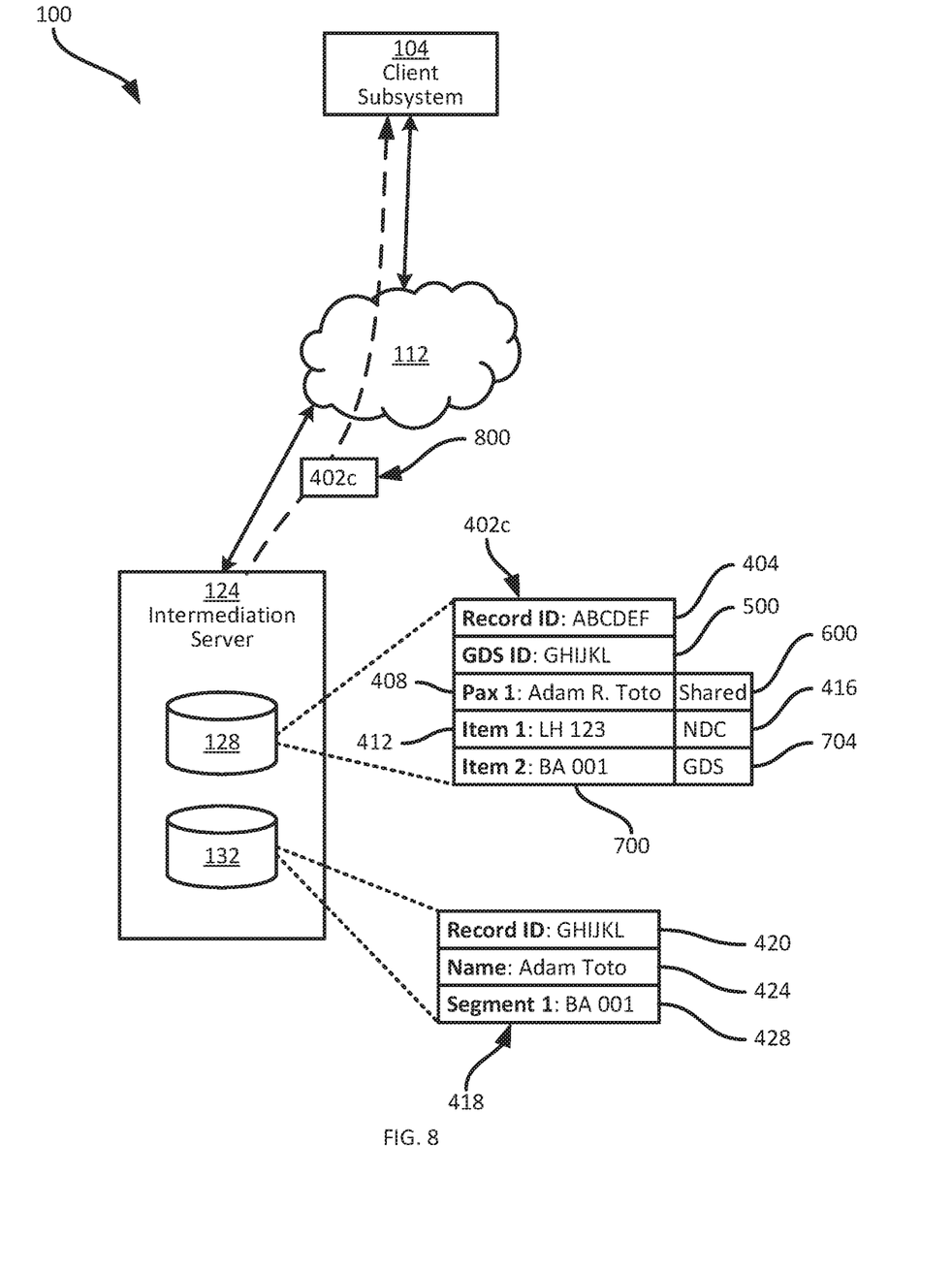
FIG. 8 is a diagram illustrating a performance of block 345 of the method of FIG. 3.
Figure 9:
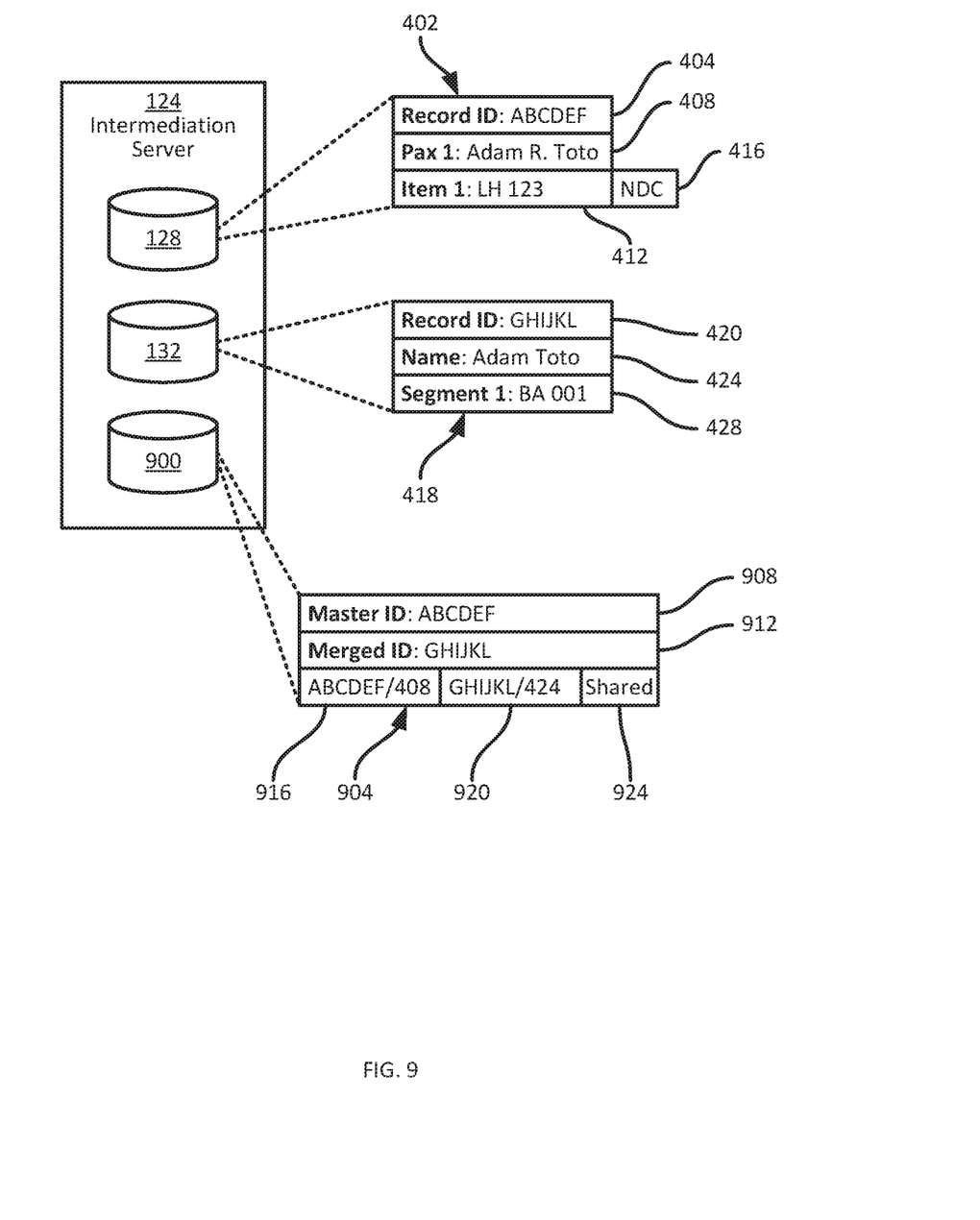
FIG. 9 is a diagram illustrating another example implementation of the method of FIG. 3.

In other implementations, data from an originating record such as the record 418 is not merged directly into a destination record such as the record 402. In other words, in such implementations a record such as the record 402c is not produced via performance of the method 300. Instead, as shown in FIG. 9, the intermediation server can maintain an additional repository 900. Rather than merging data from the record 418 into the record 402 to produce an updated version of the record (e.g. the record 402c as shown in FIG. 8), the intermediation server creates an integration record 904 in the repository 900 and stores information therein permitting the record 402c to be produced on the fly for transmission to the client subsystem 104 upon request.

More specifically, the record 904 contains a master record identifier 908, corresponding to the record 402, and a merged record identifier 912 corresponding to the record 418. The merged record identifier, in other words, takes the place of the originating record identifier 500 discussed earlier. In addition, the record 904 contains one or more sets of fields indicating shared relationships between fields of the records 402 and 418. In the illustrated example, therefore, the record 904 contains a set of fields including an destination field identifier 916, an originating field identifier 920, and a flag 924 similar to the flag 600 mentioned earlier. In some examples, the flag 924 can be omitted, as the presence of the identifiers 916 and 920 implies that those fields are shared. The record 904 can also contain an identifier of a controlling entity, such as the provider subsystem 108-1.

If a request is subsequently received for the record identifier "ABCDEF", the intermediation server 124 retrieves the record 402 itself, as well as the record 900, and generates the record 402c based on the records 402, 900 and 418 for transmission to the requesting entity. The record 402c need not be persistently stored, however.

In the event of a negative determination at block 320, the master record identifier in the record 904 dictates which "version" of conflicting data is to be employed. The client subsystem 104 may still, however, be prompted to edit either of the records 402 and 418 to remove the collision.

In other examples, the performance of blocks 320 to 330 can be omitted for certain portions of a record. For example, in the present example in which certain fields of each record define items, the likelihood of such fields colliding (i.e. containing data defining the same item) may be low, and blocks 320 to 330 may therefore be performed only for customer identification fields such as the fields 408 and 424. In other words, for some fields the determination at block 315 can be automatically negative, relieving the server 124 of the need to perform the similarity computations mentioned earlier. The field mapping may indicate which fields the above shortcut applies to.

Those skilled in the art will appreciate that in some embodiments, the functionality of the applications 212 and 216 may be implemented using pre-programmed hardware or firmware elements (e.g., application specific integrated circuits (ASICs), electrically erasable programmable read-only memories (EEPROMs), etc.), or other related components.

The scope of the claims should not be limited by the embodiments set forth in the above examples, but should be given the broadest interpretation consistent with the description as a whole.

The invention claimed is:

1. A method of integrating data objects, the method comprising:
   storing, at an intermediation server, (i) an originating record containing a first unique record identifier and a first set of data fields defining a first item supplied by a first provider, the first set including a first field identifying a common customer, and (ii) a destination record containing a second unique record identifier and a second set of data fields defining a second item supplied by a second provider, the second set including a second field identifying the common customer;
   receiving at the intermediation server, from a client device, an instruction to merge the originating record into the destination record, the request containing the first and second unique record identifiers;
   in response to receiving the instruction, updating the destination record by:
   (i) comparing the first set of data fields with the second set of data fields, (ii) for each data field of the first set that matches a corresponding data field of the second set, storing a flag in the destination record, the flag marking the corresponding data field of the second set as a shared field, and
(iii) inserting an originating record identifier field in the destination record, the originating record identifier field containing the first unique record identifier; and
sending the updated destination record to the client device for display.

2. The method of claim 1, wherein comparing the first set of data fields with the second set of data fields includes:
retrieving a field mapping identifying, for each of the first set of data fields, a corresponding field of the second set; and
comparing each of the first set of data fields to the corresponding field of the second set, according to the field mapping.

3. The method of claim 1, further comprising:
for each data field of the first set that does not match a corresponding data field of the second set according to the comparison, creating a merged data field in the destination record.

4. The method of claim 3, further comprising storing, in each merged data field, an indication that the merged data field is associated with the originating record.

5. The method of claim 4, wherein the indication that the merged data field is associated with the originating record includes the first unique record identifier.

6. The method of claim 1, wherein the comparing includes:
determining, for each data field of the first set and the corresponding data field of the second set, a similarity metric; and
detecting a match between the data field of the first set and the corresponding data field of the second set when the similarity metric is above a threshold.

7. The method of claim 1, wherein the originating record is a Global Distribution System (GDS) record, and wherein the destination record contains data acquired according to the New Distribution Capability (NDC) standard.

8. An intermediation server, comprising:
a communications interface;
a memory storing (i) an originating record containing a first unique record identifier and a first set of data fields defining a first item supplied by a first provider, the first set including a first field identifying a common customer, and (ii) a destination record containing a second unique record identifier and a second set of data fields defining a second item supplied by a second provider, the second set including a second field identifying the common customer; and
a processor connected with the communications interface and the memory, the processor configured to:
receive, from a client device via the communications interface, an instruction to merge the originating record into the destination record, the request containing the first and second unique record identifiers;
in response to receipt of the instruction, in order to update the destination record:
(i) compare the first set of data fields with the second set of data fields,
(ii) for each data field of the first set that matches a corresponding data field of the second set, store a flag in the destination record to mark the corresponding data field of the second set as a shared field, and
(iii) insert an originating record identifier field in the destination record, the originating record identifier field containing the first unique record identifier; and
send the updated destination record to the client device for display.

9. The intermediation server of claim 8, wherein the processor is further configured, in order to compare the first set of data fields with the second set of data fields, to:
retrieve a field mapping identifying, for each of the first set of data fields, a corresponding field of the second set; and
compare each of the first set of data fields to the corresponding field of the second set, according to the field mapping.

10. The intermediation server of claim 8, wherein the processor is further configured to: for each data field of the first set that does not match a corresponding data field of the second set according to the comparison, create a merged data field in the destination record.

11. The intermediation server of claim 10, wherein the processor is further configured to store, in each merged data field, an indication that the merged data field is associated with the originating record.

12. The intermediation server of claim 11, wherein the indication that the merged data field is associated with the originating record includes the first unique record identifier.

13. The intermediation server of claim 8, wherein the processor is further configured, in order to compare the first set of data fields with the second set of data fields, to:
determine, for each data field of the first set and the corresponding data field of the second set, a similarity metric; and
detect a match between the data field of the first set and the corresponding data field of the second set when the similarity metric is above a threshold.

14. The intermediation server of claim 8, wherein the originating record is a Global Distribution System (GDS) record, and wherein the destination record contains data acquired according to the New Distribution Capability (NDC) standard.

15. A non-transitory computer-readable medium storing computer-readable instructions executable by a processor of an intermediation server to:
store, in a memory of the intermediation server, (i) an originating record containing a first unique record identifier and a first set of data fields defining a first item supplied by a first provider, the first set including a first field identifying a common customer, and (ii) a destination record containing a second unique record identifier and a second set of data fields defining a second item supplied by a second provider, the second set including a second field identifying the common customer; and
receive, from a client device via a communications interface of the intermediation server, an instruction to merge the originating record into the destination record, the request containing the first and second unique record identifiers;
in response to receipt of the instruction, in order to update the destination record:
(i) compare the first set of data fields with the second set of data fields,
(ii) for each data field of the first set that matches a corresponding data field of the second set, store a flag in the destination record to mark the corresponding data field of the second set as a shared field, and (iii) insert an originating record identifier field in the destination record, the originating record identifier field containing the first unique record identifier; and send the updated destination record to the client device for display.

\* \* \* \* \*